United States Patent [19]

Kydd

[11] 4,085,578
[45] Apr. 25, 1978

[54] PRODUCTION OF WATER GAS AS A LOAD LEVELING APPROACH FOR COAL GASIFICATION POWER PLANTS

[75] Inventor: Paul H. Kydd, Scotia, N.Y.

[73] Assignee: General Electric Company, Schenectady, N.Y.

[21] Appl. No.: 777,328

[22] Filed: Mar. 14, 1977

Related U.S. Application Data

[63] Continuation of Ser. No. 634,468, Nov. 24, 1975, abandoned.

[51] Int. Cl.² ............................................. F02B 43/08
[52] U.S. Cl. .................................. 60/39.02; 60/39.12; 48/63; 48/78
[58] Field of Search ............. 60/39.02, 39.12, 39.18 B; 48/78, 83, 204, 63

[56] References Cited

U.S. PATENT DOCUMENTS 1,416,042  5/1922  Lowe ....................................... 48/83
3,704,587  12/1972  Knieb et al. ......................... 60/39.12

FOREIGN PATENT DOCUMENTS 25,771 of 1899  United Kingdom ..................... 48/78

Primary Examiner—Carlton R. Croyle
Assistant Examiner—L. J. Casaregola
Attorney, Agent, or Firm—Leo I. MaLossi; Joseph T. Cohen; Jerome C. Squillaro

[57] ABSTRACT

A coal gasification power plant is described in which low BTU gas is generated and used to operate a gas tubine and accompanying equipment for the generation of power. This plant is equipped with means for enabling the intermittent operation of multiple fixed bed coal gasifier units thereof to simultaneously produce water gas (intermediate BTU gas) and low BTU gas (producer gas) as required to operate the gas turbine.

14 Claims, 1 Drawing Figure

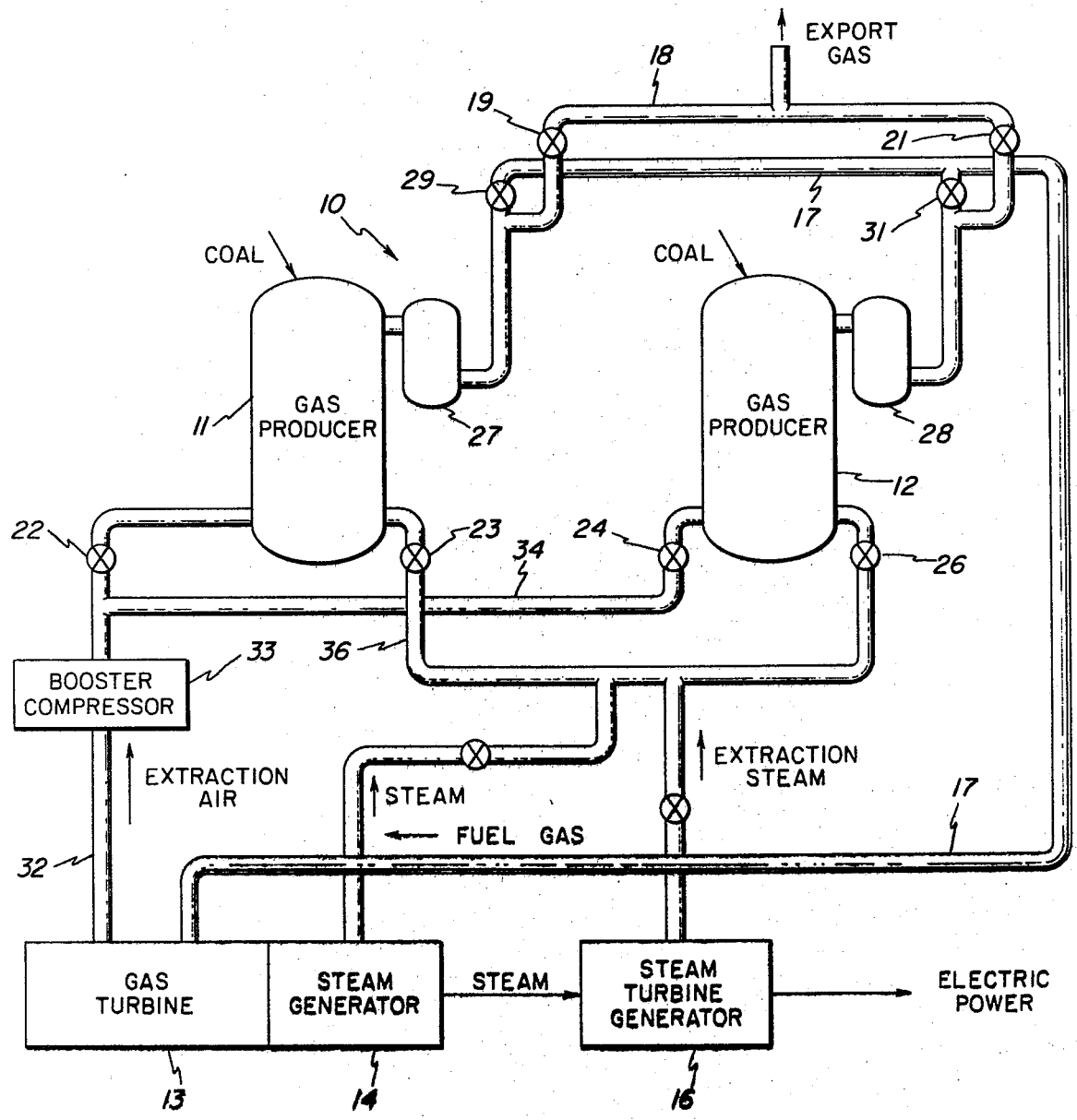

PRODUCTION OF WATER GAS AS A LOAD LEVELING APPROACH FOR COAL GASIFICATION POWER PLANTS

This is a continuation of application Ser. No. 634,468, filed Nov. 24, 1975 (abandoned).

BACKGROUND OF THE INVENTION

A frequently cited problem with the use of integrated combined-cycle coal gasification plants is that, if the plant must be operated in the mid-range mode, some of the expensive gasification and gas cleaning equipment must remain idle during such an operational mode. This is a distinct economic disadvantage.

Thus it would be desirable to be able to fully utilize all of the gasification/gas cleaning equipment whether or not the power plant is operated base loaded. It is well recognized that it would be of advantage to be able to use this equipment upon demand for the generation of intermediate BTU gas or for the synthesis of storable liquid fuels, such as methanol. However, as now contemplated, the former would require the incorporation in the system of an oxygen plant and the latter requires the capability for compressing the intermediate BTU gas to 2000 psi together with a relatively complex reactor and product separation system.

It would be advantageous to be able to incorporate in a coal gasification power plant the capability for generating intermediate BTU gas during mid-range mode operation without the imposition of significant additional capital charges.

DESCRIPTION OF THE INVENTION

The coal gasification portion of a coal gasification power plant is modified by the provision of an additional gas main to accommodate the intermediate BTU gas (water gas) produced together with additional valving whereby specific coal gasifiers in sets can be intermittently connected to the intermediate BTU gas main and then to the low BTU gas main with the appropriate intermittent introduction of compressed air or steam to these selected gasifier units. Thus, when both low BTU gas and intermediate BTU gas are to be generated, a coal gasifier (gas producer) to be operated for the generation of intermediate BTU gas receives steam alone as the blast to the underside of the coal bed (thereby cooling down the bed) and this same unit to be operated for the generation of low BTU gas receives compressed air alone as the blast to the underside of the coal bed (thereby heating up the bed). The balance of the coal gasification power plant will comprise a boost compressor, a combustor utilizing low BTU gas as fuel and a steam generator. The combustor and steam generator form part of a system for the generation of electric power. Compressed air at the pressure required is supplied to the gasifier units by the boost compressor and the steam generator (or steam turbine) provides the steam required for operation of the gasifier units. Steam directly from the steam generator is preferred for the manufacture of intermediate BTU gas.

BRIEF DESCRIPTION OF THE DRAWING

The subject matter of the instant invention for which protection is sought is presented as claims at the conclusion of the written description of the invention set forth herein. The description sets forth the manner and process of making and using the invention and the accompanying drawing forms part of the description schematically illustrating the best mode contemplated.

MANNER AND PROCESS OF MAKING AND USING THE INVENTION

In order to simplify the explanation, the coal gasification power plant 10 as illustrated comprises only one pair of gas producers 11, 12 and a single set of machinery (gas turbine 13, heat recovery steam generator 14, steam turbine generator 16) for the generation of electric power. Manifestly, the actual number of gas producer units and electric power generator sets will vary with the power load to be accommodated.

Gas turbine 13 is required to operate continuously and, therefore, must continuously receive fuel gas via main 17. In addition to low BTU gas main 17, an additional gas main 18 is provided to accommodate intermediate (about 300 BTU/cu.ft.) BTU gas for sale or storage, during periods of operation in the mid-range mode.

During base load operation, valves 19 and 21 would both be closed while all of valves 22, 23, 24 and 26 would be open to provide a continuous blast of steam and air to the underside of the coal bed in the fixed bed gas producers 11, 12. The producer gas (low BTU gas, about 150 BTU/cu.ft.) leaving gas producers 11, 12 passes through the cooling, cleanup systems 27, 28, respectively, in order to reach low BTU main 17 via valves 29, 31, both in the open position.

The compressed air for the gas producer operation in the system shown is extraction air from the gas turbine compressor. This air leaves the compressor via conduit 32 and enters boost compressor 33. In a power plant wherein the combustor is a boiler, the boost compressor takes in air from the atmosphere to supply the gasifiers. This air, now at a higher pressure, is distributed via conduit 23 and valves 22, 24 to the underside of gas producers 11, 12.

Steam for the operation of the gas producers may be extraction steam from the steam turbine portion of the steam turbine generator 16 or may be obtained from the heat recovery steam generator. The former source is preferable for operation in which only low BTU gas is being generated; the latter source is preferred when intermediate BTU gas is to be generated. Valving is shown to accommodate the selection. This steam is distributed via conduit 36 and valves 23, 26 to the gas producers 11, 12, respectively.

Thus, during base load operation, low BTU gas is generated both in gas producer 11 and in gas producer 12 with these outputs passing through the cooling cleanup systems 27, 28 and then entering low BTU gas main 17 for transport to the combustor units of the number of gas turbine units operative at that time for generation of electric power in the conventional manner. The requisite inputs to the underside of the coal in the fixed bed gasifiers 11, 12 is provided as described hereinabove from the gas turbine and boost compressors in tandem and the steam turbine(s).

When it becomes necessary to operate in the mid-range mode of power generation, gas producers 11, 12 will be used alternately to generate producer gas or water gas with the net result being the capabilities for continuously supplying producers gas to low BTU main 17 and for continuously supplying water gas to the intermediate BTU gas main 18. For this operation, when valves 22, 26, 29 and 21 are open, valves 23, 24, 19 and 31 are closed. With this arrangement, gas producer 11 receives only extraction air, while gas producer 12 receives only steam. Thus, during this cycle low BTU gas will be produced in gas producer 11 (and the gas producers operated therewith as a first set) and will enter low BTU gas main 17 in the usual manner, while intermediate BTU gas will be generated in gas producer 12 (and other gas producers operated therewith as a second set) and (instead of entering main 17) will enter intermediate BTU gas main 18 via valve 21. This intermediate BTU gas will usually be removed from the power plant itself and sold or stored for sale.

After the desired period of operation with this arrangement, the valve settings are reversed with valves 23, 24, 19 and 31 in the open position, and valves 22, 26, 29 and 21 in the closed position. The period of cycling is determined by gas analysis. Gas producer 11 (or first set) now serves to generate water gas and gas producer 12 (or second set) generates producer gas. The water gas from gas producer 11 (or first set) is supplied to intermediate BTU gas main 18 via valve 19, while the producer gas generated in gas producer 12 (or second set) is supplied to low BTU gas main 17 via valve 31.

Thus, it may be seen that the gas turbine 13 (or other combustor) will receive a continual supply of fuel gas at the same time as intermediate BTU gas is continuously generated.

What I claim as new and desire to secure by Letters Patent of the United States is:

1. In an integrated coal gasification power plant wherein the product gas outlets of fixed bed coal gasifiers are in flow communication with at least one combustor via a gas main, each such combustor is part of a system for the generation of system and production of electric power therefrom, said system and a boost compressor are in flow communication with said coal gasifiers to supply steam and compressed air, respectively, as blast gases for said coal gasifiers, the improvement comprising:

first and second gas mains, said first gas main being in flow communication with said at least one combustor and said second gas main being connected for discharge of the gas received therein from said coal gasification power plant;

first conduit means for enabling communication between said first gas main and means for the egress of product gas from at least one first gasifier;

first valve means, located in each first conduit means, for selectively placing said first gas main into, and out of, flow communication with said means for the egress of product gas from at least one first gasifier;

second conduit means for enabling communication between said first gas main and means for the egress of product gas from at least one second gasifier;

second valve means, located in each second conduit means, for selectively placing said first gas main into, and out of, communication with said means for the egress of product gas from at least one second gasifier;

third conduit means for enabling communication between said second gas main and said means for the egress of product gas from at least one first gasifier;

third valve means, located in each third conduit means, for selectively placing said second gas main into, and out of, flow communication with said means for the egress of product gas from at least one first gasifier;

fourth conduit means for enabling communication between said second gas main and said means for the egress of product gas from at least one second gasifier;

fourth valve means, located in each fourth conduit means, for selectively placing said second gas main into, and out of, flow communication with said means for the egress of product gas from at least one second gasifier;

fifth conduit means for enabling communication between said boost compressor and means for the ingress of air to at least one first gasifier;

fifth valve means, located in each fifth conduit means, for selectively placing said boost compressor into, and out of, flow communication with said means for the ingress of air to at least one first gasifier;

sixth conduit means for enabling communication between said boost compressor and means for the ingress of air to at least one second gasifier;

sixth valve means, located in each sixth conduit means, for selectively placing said boost compressor into, and out of, flow communication with said means for the ingress of air to at least one second gasifier;

seventh conduit means for enabling communication between a source of steam in said system and means for the ingress of steam to at least one first gasifier;

seventh valve means, located in each seventh conduit means, for selectively placing said source of steam into, and out of, flow communication with said means for the ingress of steam to at least one first gasifier;

eighth conduit means for enabling communication between said source of steam and means for the ingress of steam to at least one second gasifier; and eighth valve means, located in each eighth conduit means, for selectively placing said source of steam into, and out of, flow communication with said means for the ingress of steam to at least one second gasifier;

each of said valve means being independently actuable whereby said coal gasification power plant can be selectively operated in either the base load mode of power generation or in the mid-range mode of power generation.

2. The improvement recited in claim 1 wherein the system for the generation of steam and production of electric power comprises a gas turbine/heat recovery steam boiler/steam turbine generator combination and the gas turbine compressor is in flow communication with the boost compressor.

3. The improvement recited in claim 2 wherein the source of steam in the system is the steam turbine generator.

4. The improvement recited in claim 2 wherein the source of steam in the system is the heat recovery steam boiler.

5. The improvement recited in claim 1 wherein the system for generation of steam and production of electric power comprises a boiler/steam turbine generator combination.

6. The improvement recited in claim 5 wherein the source of steam in the system is the turbine generator.

7. The improvement recited in claim 5 wherein the source of steam in the system is the boiler.

8. In a process for generating electric power in an integrated coal gasification plant wherein low BTU gas is produced from coal introduced into fixed bed coal gasifiers, said coal gasifiers being connected to systems for cleaning the low BTU gas, the low BTU gas after cleanup is conducted to at least one combustor, each such combustor being part of a system for the generation of system and production of electric power, and air from a boost compressor together with steam from said system are supplied to the underside of the beds of said coal gasifiers, the improvement comprising:

alternately operating said coal gasifiers in the base load mode of power generation in which all of said coal gasifiers receive a continuous blast of steam and air to generate low BTU gas and in the mid-range mode of power generation in which said coal gasifiers are utilized as first and second sets of coal gasifiers, said first set being operated to generate low BTU gas with a compressed air blast for delivery to said at least one combustor and said second set being simultaneously operated to generate intermediate BTU gas with a steam blast for discharge from said coal gasification plant and the operation of said first and second sets is periodically interchanged.

9. The improvement recited in claim 8 wherein a gas turbine/heat recovery steam boiler/steam turbine generator combination is provided as the system for the generation of steam and production of electric power and the gas turbine compressor is in flow communication with the boost compressor.

10. The improvement recited in claim 9 wherein the steam for the steam blast is provided as extraction steam from the steam turbine generator.

11. The improvement recited in claim 9 wherein the steam for the steam blast is provided from the heat recovery steam boiler.

12. The improvement recited in claim 8 wherein a boiler/steam turbine generator combination is provided as the system for the generation of steam and production of electric power.

13. The improvement recited in claim 12 wherein the steam for the steam blast is provided as extraction steam from the steam turbine generator.

14. The improvement recited in claim 12 wherein the steam for the steam blast is provided from the boiler.

* * * * *